(12) United States Patent
Nakano et al.

(10) Patent No.: US 6,434,342 B1
(45) Date of Patent: *Aug. 13, 2002

(54) ELECTRIC CIRCUIT BOARD SYSTEM FOR CAMERA CAPABLE OF STRUCTURING TARGET CAMERA BY MERELY EXCHANGING UNIT CIRCUIT BOARD

(75) Inventors: Toshifumi Nakano, Sagamihara; Hiroaki Miyasho, Hino; Koichi Nakata, Kokubunji, all of (JP)

(73) Assignee: Olympus Optical Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/385,557

(22) Filed: Aug. 30, 1999

(30) Foreign Application Priority Data

Aug. 31, 1998 (JP) .......................................... 10-245170
Aug. 9, 1999 (JP) .......................................... 11-232711

(51) Int. Cl.[7] .......................... G03B 17/00; G03B 17/02
(52) U.S. Cl. ...................................... 396/541; 396/542
(58) Field of Search ................................. 396/541, 542

(56) References Cited

U.S. PATENT DOCUMENTS 4,728,978 A    3/1988   Inoue et al.
4,769,665 A  * 9/1988   Dagborn ....................... 396/541
4,939,533 A  * 7/1990   Okada et al. ................. 354/402
5,382,994 A  * 1/1995   Naito et al. .................. 396/530
5,477,264 A  * 12/1995  Sarbadhikari et al. ....... 348/231
5,493,332 A  * 2/1996   Dalton et al. ................ 348/207
5,541,687 A  * 7/1996   Pearson ...................... 354/145.1
5,727,246 A  * 3/1998   Hasuda et al. .............. 396/486
5,978,016 A  * 11/1999  Lourette et al. ............. 348/64
6,009,206 A  * 12/1999  Acharya ...................... 382/251
6,106,457 A  * 8/2000   Perkins et al. .............. 600/175
6,160,967 A  * 12/2000  Mizobuchi ................... 396/542
6,217,165 B1 * 4/2001   Silverbrook ................. 347/86

FOREIGN PATENT DOCUMENTS

JP          63-113135         7/1988

* cited by examiner

*Primary Examiner*—Christopher Mahoney
(74) *Attorney, Agent, or Firm*—Frishauf, Holtz, Goodman & Chick, P.C.

(57) ABSTRACT

An electric circuit board system for a camera includes at least one main electric circuit board having a central processing unit for performing a control of a camera, and at least one connection section for having an electric connection with other electric circuit boards. A plurality of unit circuit boards can be connected with the above-described at least one connection section, with mutually different specifications. Any one optional unit circuit board is selected from the plurality of unit circuit boards and is connected to at least one of the main electric circuit boards, for structuring a camera.

3 Claims, 14 Drawing Sheets

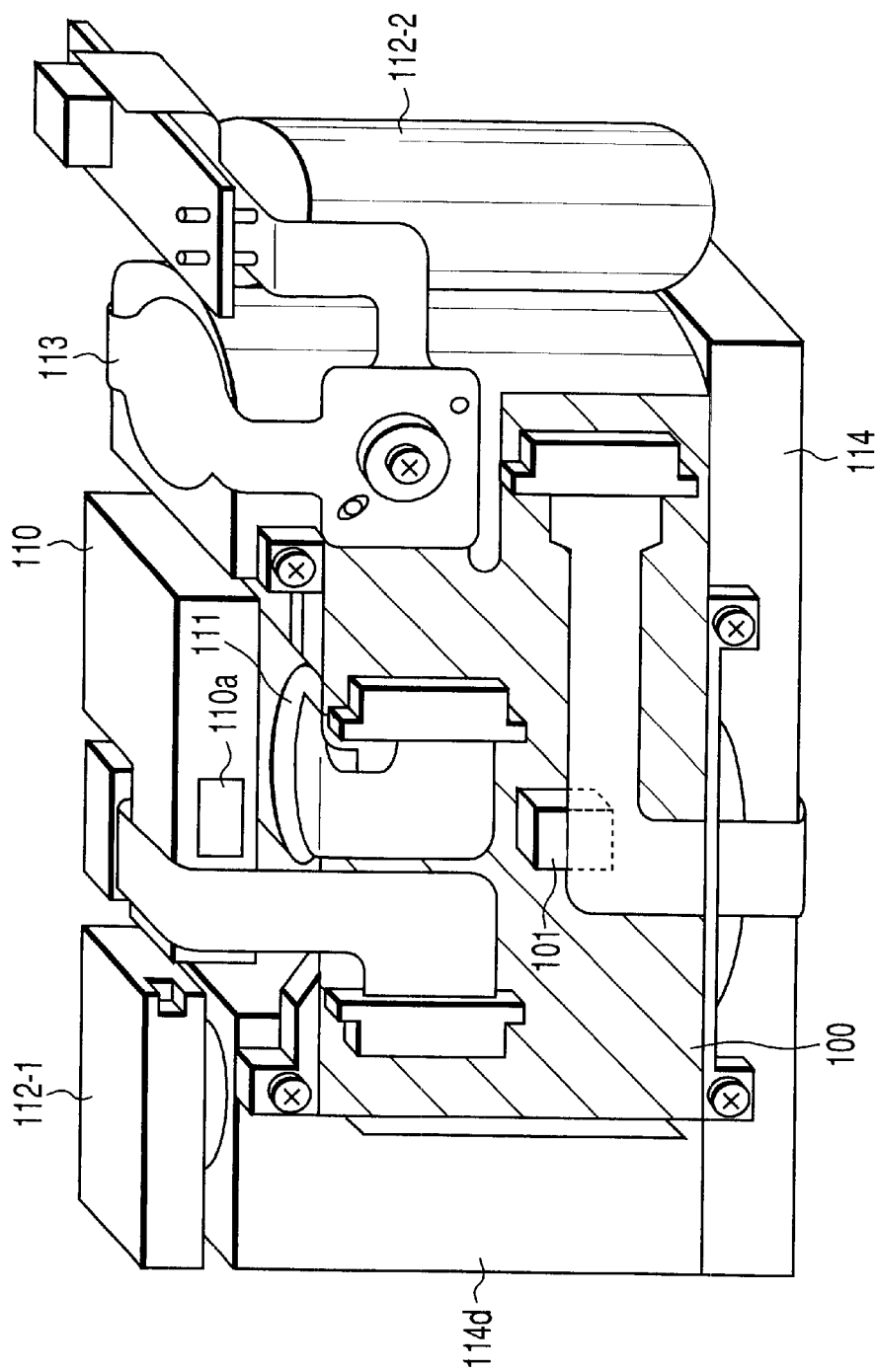
F I G. 3

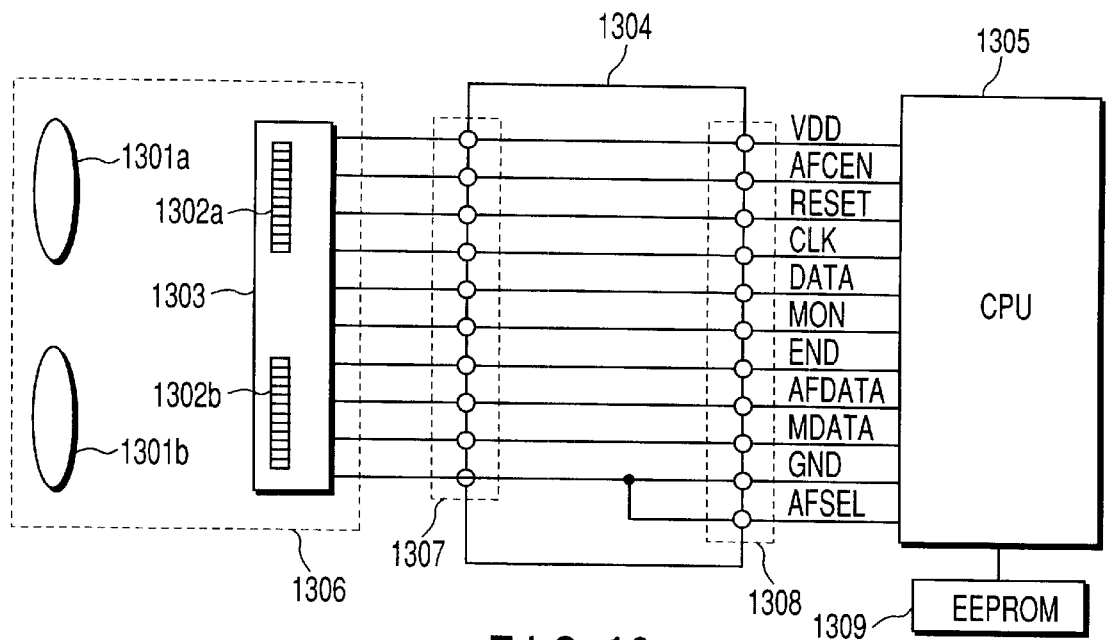
F I G. 13
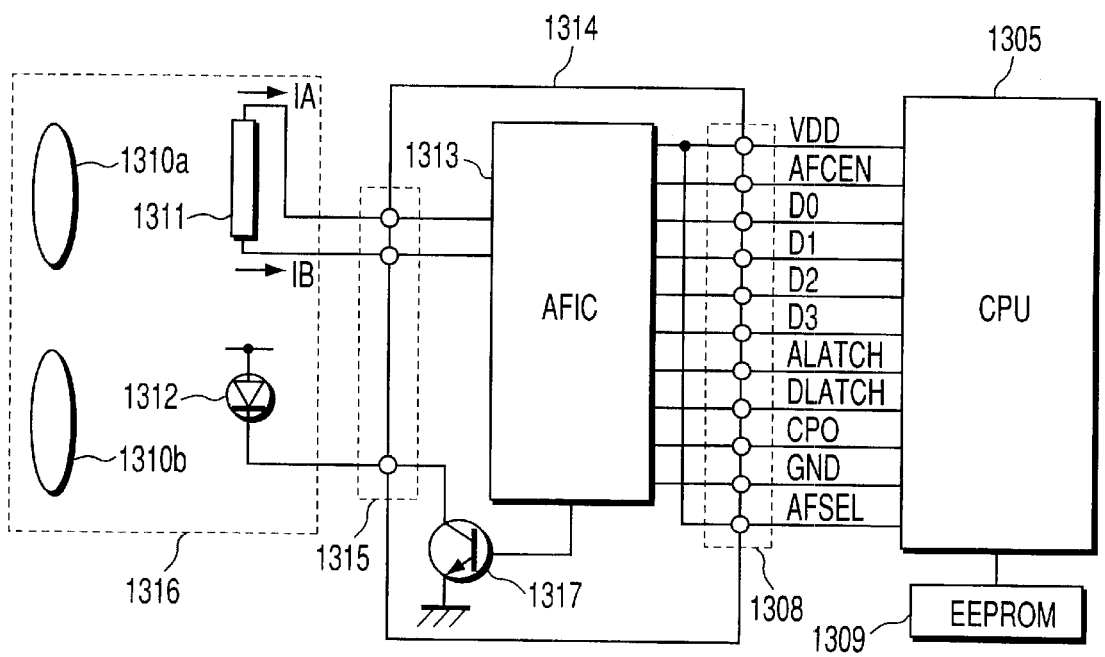
F I G. 14

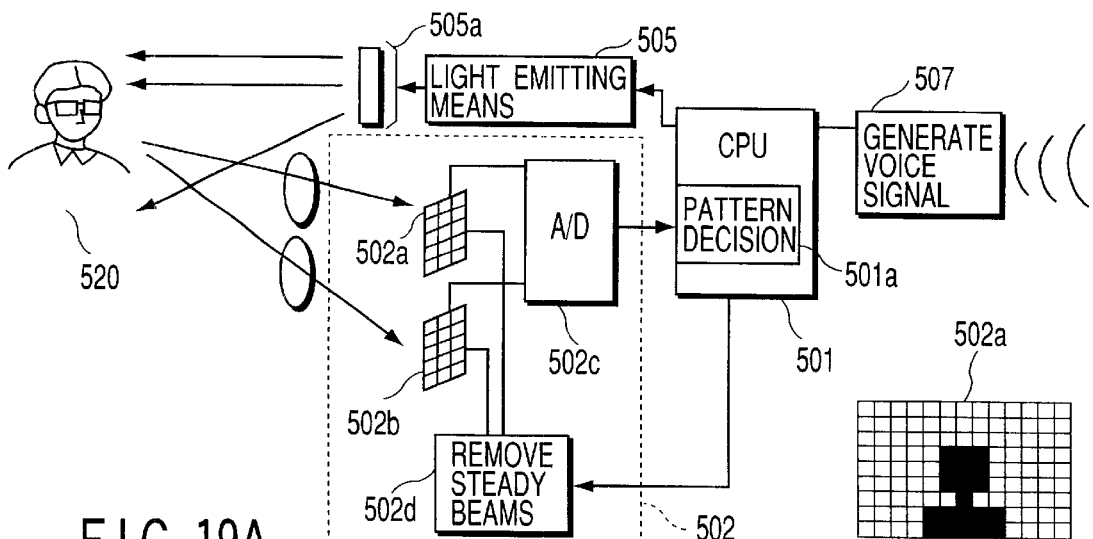
FIG. 19A
FIG. 19B
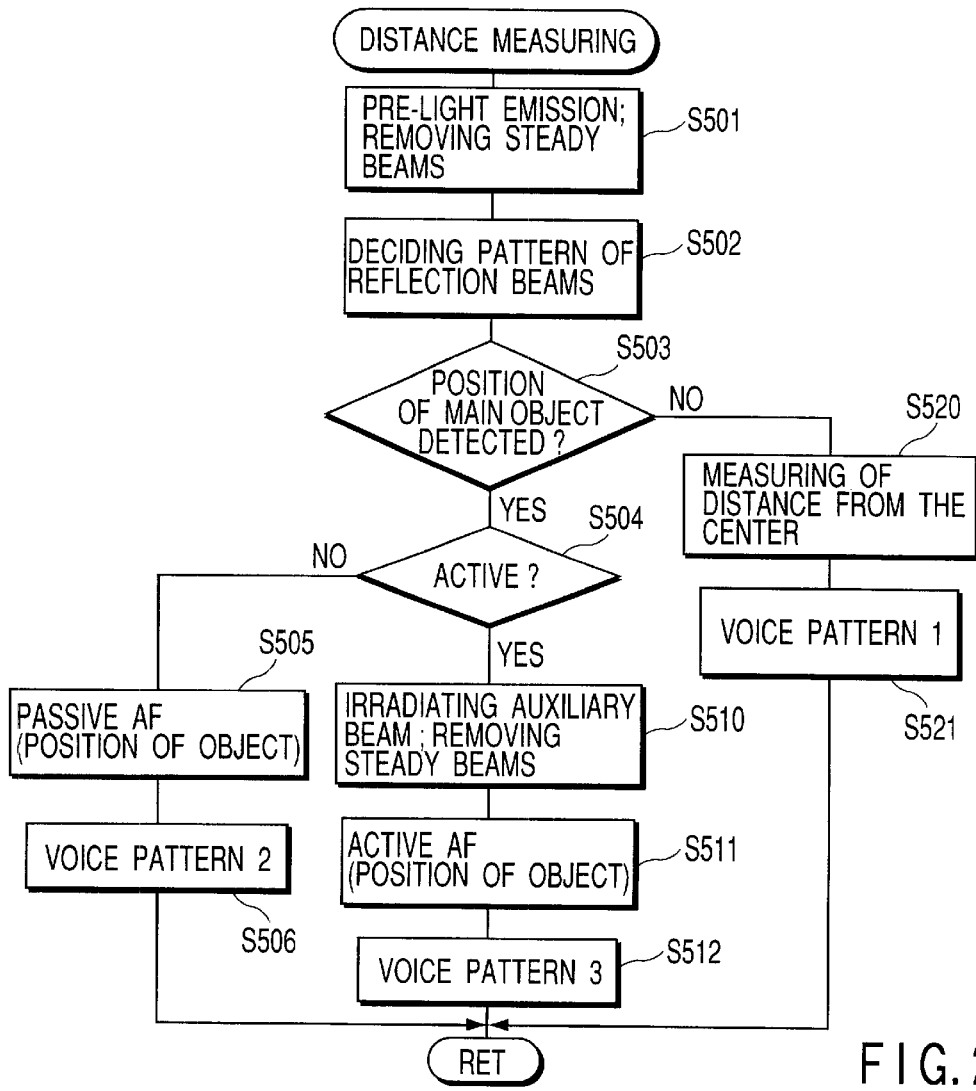
FIG. 20

ELECTRIC CIRCUIT BOARD SYSTEM FOR CAMERA CAPABLE OF STRUCTURING TARGET CAMERA BY MERELY EXCHANGING UNIT CIRCUIT BOARD

BACKGROUND OF THE INVENTION

The present invention relates to an electric circuit board system for a camera.

Jpn. UM. Appln KOKAI Publication No. 63-113135 discloses a structure of a system disposed inside a camera, which system consists of one main circuit board into which there are loaded, in high density, electric devices including a photometric sensor, a dimming sensor, a control circuit device for carrying out an exposure control and a stroboscopic photographing control based on output signals from these sensors, and the like.

However, according to a conventional electric circuit board system for a camera including the above-described Jpn. UM. Appln KOKAI Publication No. 63-113135, it is necessary to exchange a main circuit board itself when the version of the system is changed to an upgraded version or when it is desired to structure a camera of a different type. Further, as the main circuit board itself has many functions, there is a problem that the size of the main circuit board becomes larger in this case.

BRIEF SUMMARY OF THE INVENTION

The present invention has been made in the light of the above-described problems, and it is an object of the invention to provide an electric circuit board system for a camera capable of obtaining a target camera structure by merely exchanging a relevant unit of a camera when there has been a change in the version of the system or when a type of the camera has been changed to a different type.

In order to achieve the above object of the invention, according to a first aspect of the invention, there is provided an electric circuit board system for a camera, comprising:

at least one main electric circuit board having a central processing unit for performing a control of a camera, and at least one connection section for having an electric connection with other electric circuit boards; and a plurality of unit circuit boards with mutually different specifications, capable of being connected with the above-described at least one connection section, with any one optional unit circuit board being selected from the plurality of unit circuit boards, and being connected to at least one of the main electric circuit boards, for structuring a camera.

According to a second aspect of the invention, there is provided an electric circuit board structure for a camera structured by combining a plurality of units, the electric circuit board structure comprising:

a main circuit board provided with a CPU for controlling the whole operation of a camera; and an auxiliary circuit board provided on each of the plurality of units, structured to be electrically connectable with the main circuit board, and provided with an electric part relating to each operation of the plurality of units.

Further, according to a third aspect of the invention, there is provided an electric circuit board system for a camera, comprising:

at least one main circuit board; and a plurality of functional-unit circuit boards for achieving individual functions of a camera, with any one functional-unit circuit board being selected from the plurality of functional-unit circuit boards according to a specification of a camera, and being connected to the at least one main circuit board, for structuring a camera.

Further, according to a fourth aspect of the invention, there is provided an electric circuit board system for a camera, comprising:

a plurality of kinds of functional electric circuit boards mounted with a sensor or an actuator for achieving an individual function of a camera, and provided with a connection terminal of a common specification for connection with other electric circuit board; and a master electric circuit board provided with a plurality of connection terminals to connect with the plurality of kinds of functional electric circuit boards, for integrally controlling the functional electric circuit boards.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a view for showing a state that each unit shown in FIG. 2 is connected to the main circuit board.

FIG. 13 is a view for explaining a third embodiment of the present invention, which shows a structure of a passive AF unit disposed on a main circuit board.

FIG. 14 is a view for explaining the third embodiment of the present invention, which shows a structure of an active AF unit disposed on the main circuit board.

FIG. 19A is a block diagram for showing a main structure for achieving a super combination AF, and FIG. 19B is a view for showing a pattern of a reflection signal beam incident to an area sensor 502.

FIG. 20 is a flowchart for showing a process of a distance measuring according to the super combination AF.

DETAILED DESCRIPTION OF THE INVENTION

Embodiments of the present invention will be explained in detail with reference to the drawings.

Figure 1:
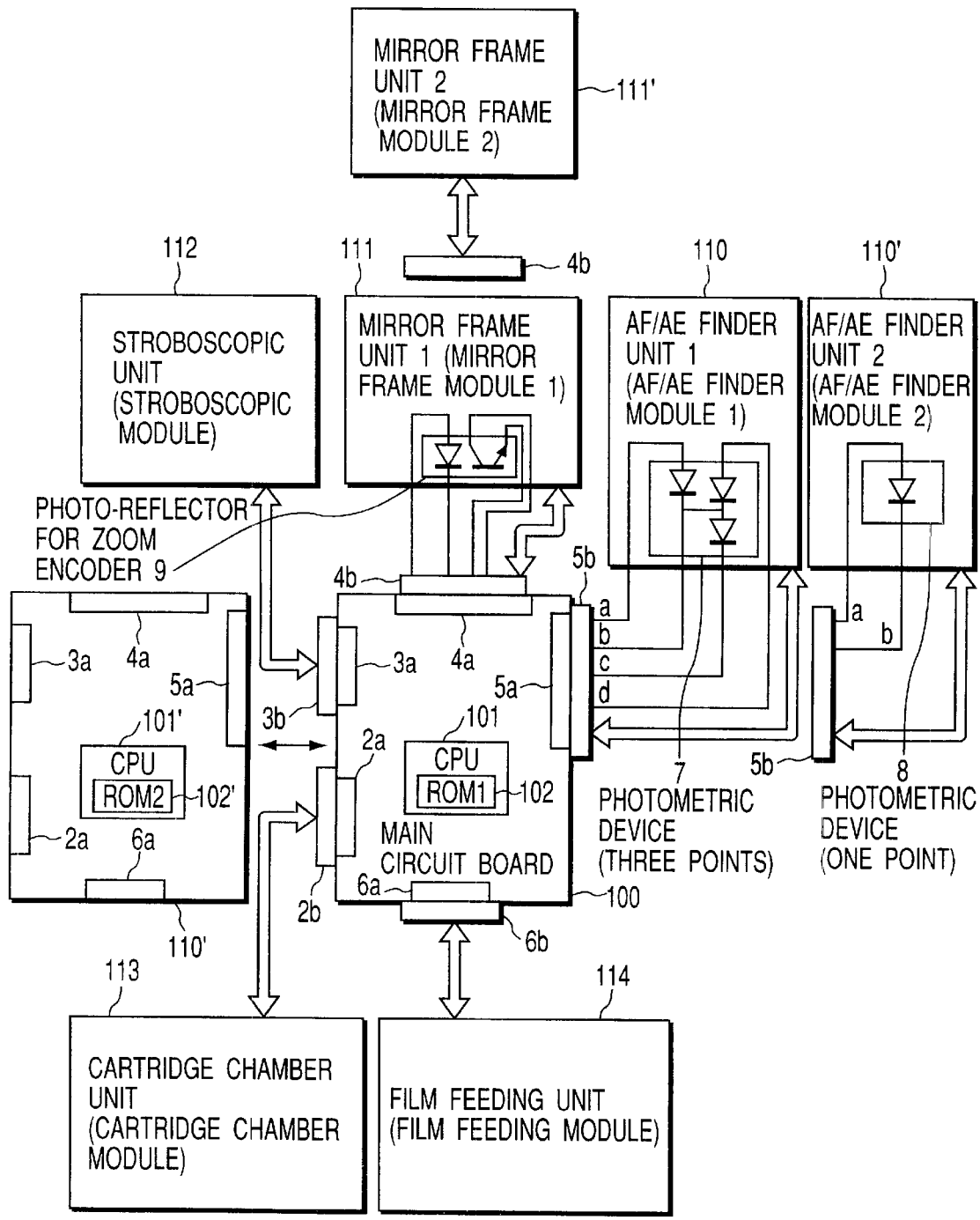
FIG. 1 is a view for explaining the outline of an electric circuit board system for a camera to which the present invention is applied.

FIG. 1 is a view for explaining an outline of the embodiments.

In FIG. 1, there are provided a plurality of, that is, a first to a fifth, main circuit board connectors 2a to 6a on a main flexible printed circuit board (hereinafter to be referred to as a main circuit board) 100 as a main electric circuit board mounted with a CPU 101 provided with a ROM1 102 for storing a predetermined program and for controlling the whole of a camera. There are also prepared modules 110 to 114, illustrated as blocks in the drawing, as a plurality of unit circuit boards for achieving various functions to perform the operation of a camera. In the modules 110 to 114, there are provided module-side connectors 2b to 6b which can be connected respectively to the main circuit board connectors 2a to 6a.

The module 110 as an AF/AE finder unit 1 provided with a three-point photometric device 7 can be connected to the main circuit board connector 5a of the main circuit board 100 by the module-side connector 5b. A module 110' as an AF/AE finder unit 2 provided with a one-point photometric device 8 has the same module-side connector 5b as that of the module 110, and can, therefore, be connected to the main circuit board connector 5a in place of the module 110.

Further, the module 111 as a mirror frame unit 1 provided with a zoom-encoder photo-reflector 9 can be connected to the main circuit board connector 4a of the main circuit board 100 by the module-side connector 4b. A module 111' as a mirror frame unit 2 not provided with a photo-reflector has the same module-side connector 4b as that of the module 111, and can, therefore, be connected to the main circuit board connector 4a in place of the module 111.

The module 112 as a stroboscopic unit can be connected to the main circuit board connector 3a of the main circuit board 100 by the module-side connector 3b. The module 113 as a cartridge chamber unit can be connected to the main circuit board connector 2a of the main circuit board 100 by the module-side connector 2b. The module 114 as a film-feeding unit can be connected to the main circuit board connector 6a of the main circuit board 100 by the module-side connector 6b.

In the above-described structure, according to the present embodiment, it is possible to structure several different types of cameras by exchanging each module connected to the main circuit board 100. For example, when the modules 110 to 114 are connected to the main circuit board 100 respectively through the main circuit board connectors 3a to 6a and the module-side connectors 3b to 6b, it is possible to structure a camera having a zoom lens and capable of center-weighted photometry and an average photometry, as the module 110 has the multi-point, in this case, a three-point, photometric device 7 and the module 111 has the zoom-encoder photo-reflector 9.

In this embodiment, when, for example, the module 110' having the one-point photometric device is connected to the main circuit board 100 in place of the module 110, and when the module 111' of a single focal point and having no zoom encoder is connected to the main circuit board 100 in place of the module 111, it is possible to structure a camera capable of carrying out only an average photometry with a single focal-point lens, at lower cost than the above-described camera.

In the case of structuring a camera involving a change of version to an improved version or a camera of a different type, it is also necessary to change a program stored in the ROM1 (102) to other program. However, in this case, as the hardware structure may be exactly the same, it is possible to easily cope with the change in the type of a camera. FIG. 1 shows a main circuit board 100' having a ROM2 (102') which stores a program after the program has been changed.

As described above, according to the present embodiment, in a camera having a plurality of units for achieving respective functions of the units, when the version of the camera has been changed or when the camera has been changed to a camera of other type, it is possible to obtain a target camera by simply exchanging relevant units. Because of this characteristic, it is also possible to provide cameras at low cost through a common use of the cameras. Further, it is also possible to guarantee the performance of a camera at the time of assembling the camera, by simply checking the functions and performance of units for achieving the relevant functions of the camera.

Figure 2:
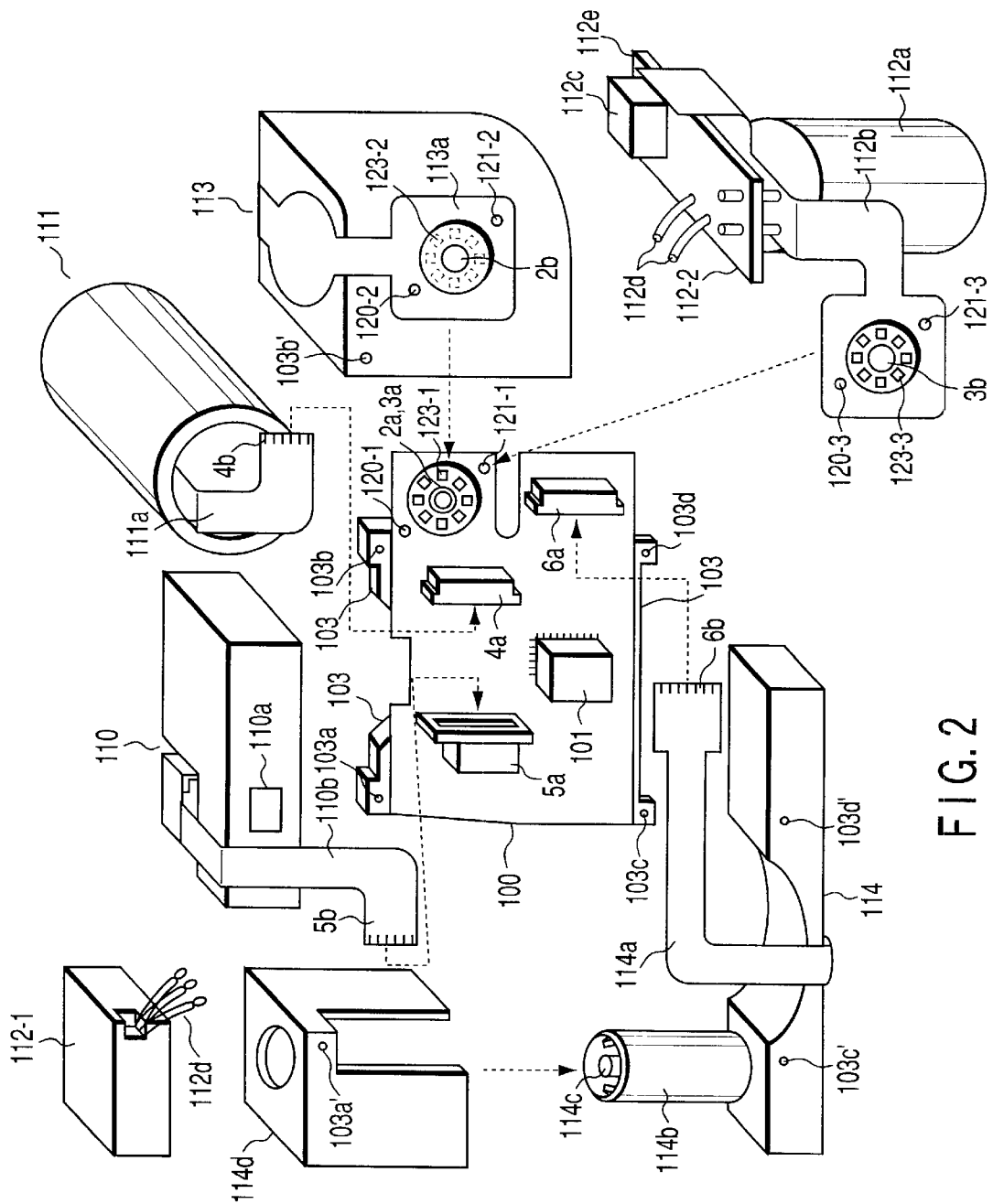
FIG. 2 is a view for showing a state that each module for achieving each function of a camera is connected to a main circuit board.

FIG. 2 is a view for illustrating a state how the above-described modules (units) 110 to 114 are connected to the main circuit board 100. The AF/AE finder unit 110 having a finder field of vision frame 110a and having accommodated therein AF and AE devices (such as a light-emitting device, a light-receiving device, a photometric device), and a finder optical system, is installed with a flexible circuit board 110b. The module-side connector 5b of the flexible circuit board 110b is connected to the main circuit board connector 5a of the main circuit board 100.

The mirror frame unit 111 for accommodating a photographic lens system and a photo-interruptor for detecting a focal distance, is installed with a flexible circuit board 111a. The module-side connector 4b of the flexible circuit board 111a is connected to the main circuit board connector 4a of the main circuit board 100. Through the module-side connector 4b, there are input a signal for driving a lens focusing motor and a signal for executing a stopping or a zooming, and there are also output a detection signal from the photo-interruptor.

The film feeding unit 114 as a driving system unit is installed with a spool 114b incorporating a motor 114c, and the flexible circuit board 114a having the module-side connector 6b. A spool chamber 114d is installed so as to surround the spool 114b. Inside the film feeding unit 114, there are accommodated gears and various kinds of switches for transmitting a driving force from the motor 114c, and a photo-interruptor for detecting a movement of a film. The module-side connector 6b of the flexible circuit board 114a fitted to the film feeding unit 114, is connected to the main circuit board connector 6a of the main circuit board 100.

The cartridge chamber unit 113 is installed with a screw hole as the module-side connector 2b, and a flexible circuit board 113a provided with positioning boss holes 120-2 and 121-2. In the case of a camera for a new film, there are stored inside the cartridge chamber unit 113, a photo-interruptor and a photo-reflector for reading the ISO sensitivity of a film expressed in an information code on a data disk of a film cartridge, and the number of frames of the film. In the case of a 135-type camera, there is provided inside the cartridge chamber unit 113, a contact point of a DX code. Around the screw hole 2b of the flexible circuit board 113a and also at the rear side of this flexible circuit board, a gold-plated pattern 123-2 is provided.

The main circuit board 100 is also provided with a screw hole as the main circuit board connector 2a and positioning boss holes 120-1 and 21-1. A gold-plated pattern 123-1 is provided around them. By superimposing the two screw holes 2a and 2b and fixing them together with a screw, the flexible circuit board 113a is connected to the main circuit board 100.

The stroboscopic unit is structured by stroboscopic unit 112-1 and 112-2. Inside the stroboscopic unit 112-1, there are accommodated a light-emitting tube for executing a stroboscopic light emission, and a reflection umbrella. A lead wire 112d is extracted from the inside of the unit to the outside and is fixed to a stroboscopic circuit board 112e of the stroboscopic unit 112-2 to be described later.

The stroboscopic unit 122-2 consists of a main capacitor 112a, a transformer 112c for increasing a voltage, and a stroboscopic circuit board 112e mounted with a light-emitting circuit not shown. A flexible circuit board 112b is fitted between the main capacitor 112a and the stroboscopic circuit board 112e. An extended part of the flexible circuit board 112b is provided with a screw hole for stopping a screw as the module-side connector 3b, and positioning boss holes 120-3 and 121-3. A metal-plated pattern 123-3 is provided around the boss hole 3b. By superimposing the two screw holes 3a and 3b and fixing them together with a screw, the flexible circuit board 112b is connected to the main circuit board 100.

Further, a supporting plate 103 for supporting the main circuit board 100 is provided with a screw hole 103a. This screw hole 103a and a screw hole 103a' of a spool chamber 114d are superimposed and are fixed together with a screw. The supporting plate 103 is also provided with a screw hole 103b, and this screw hole 103b and a screw hole 103b' of the cartridge chamber unit 113 are superimposed and are fixed together with a screw. The supporting plate 103 is provided with screw holes 103c and a 103d. The screw holes 103c and 103d and screw holes 103c' and 103d' of the film feeding unit 114 are superimposed and are fixed together with a screw.

FIG. 3 is a view for showing a state that the above-described units are connected to the main circuit board 100 by their flexible circuit boards. The main circuit board 100 is a portion illustrated by shaded lines.

Figure 4:
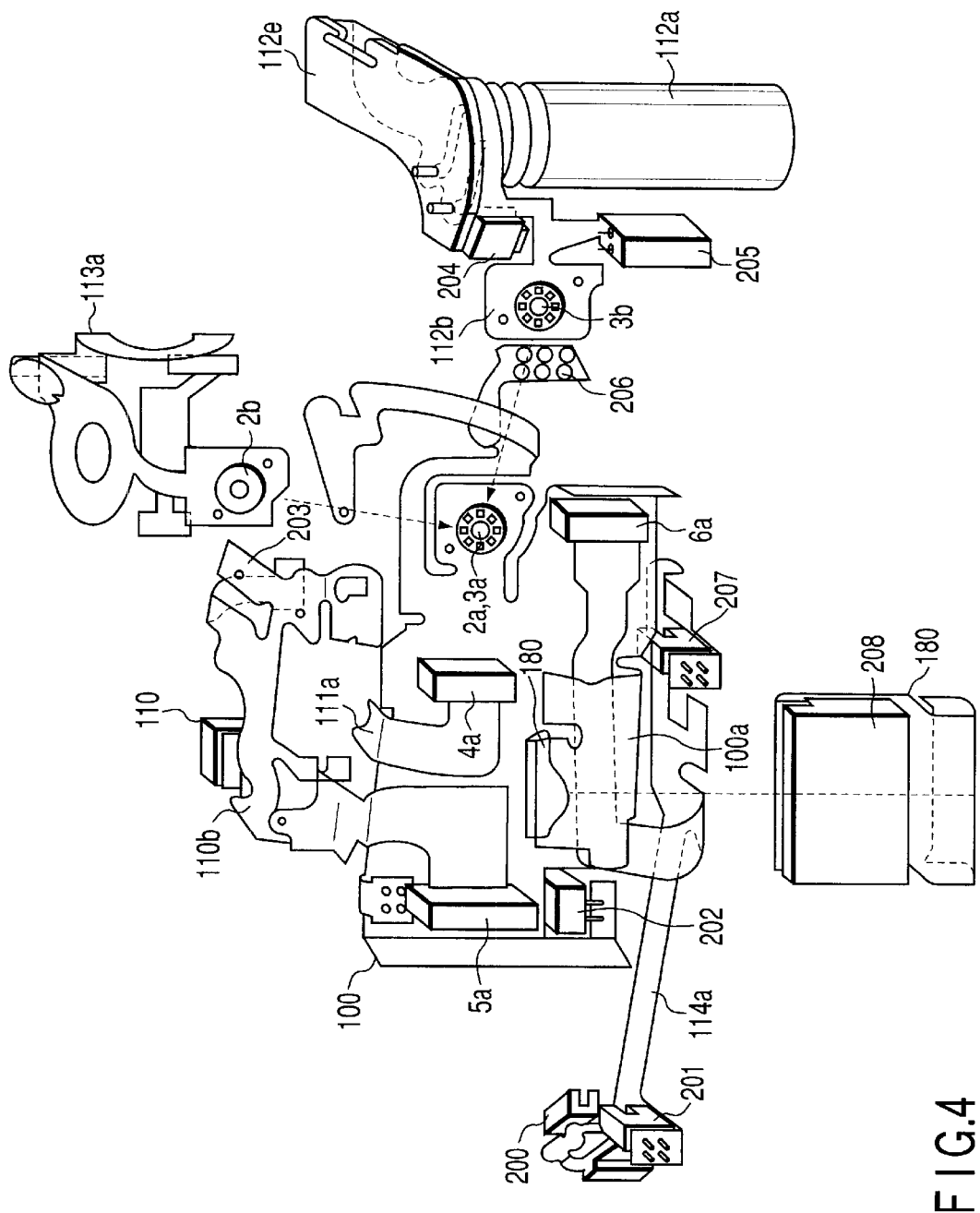
FIG. 4 is a view for showing in further detail a shape of each flexible circuit board provided on each unit of a camera.

FIG. 4 is a view for showing in further detail the above-described flexible circuit boards. To the main circuit board connector 5a of the main flexible circuit board 100, there is connected an AF module 110 consisting of a pair of passive devices, and there is also connected a finder flexible circuit board 110b having an island-shaped portion 203 for installing a photometric device. To a return section 100a of the main flexible circuit board 100, there is connected by thermocompression-bonding a relay flexible circuit board 180 having a display LCD 208 bonded thereto by thermocompression. To the main circuit board connector 6a of the main flexible circuit board 100, there is connected via the return section 100a a film feeding flexible circuit board 114a installed with a motor photo-interruptor 200 for detecting a rotation of a film driving motor, a photo-interruptor 201 for changing over a film feeding, and a photo-interruptor 207 for detecting a completion of a change-over of a driving system.

A mirror frame flexible circuit board 111a is connected to the main circuit board connector 4a of the main flexible circuit board 100.

Further, a screw hole as the main circuit board connector 2a of the main flexible circuit board 100 and a screw hole 2b as the cartridge flexible circuit board 113a are superimposed and are fixed together with a screw, so that the cartridge flexible circuit board 113a is connected to the main flexible circuit board 100. Similarly, a screw hole as the main circuit board connector 3b and the screw hole 3b of the stroboscopic flexible circuit board 112b installed with the main capacitor 112a, the stroboscopic circuit board 112e, an IGBT 204 for controlling a stroboscopic light emission, and a trigger transformer 205, are superimposed and are fixed together with a screw, so that the stroboscopic flexible circuit board 112b is connected to the main flexible circuit board 100.

Further, the main flexible circuit board 100 is provided with a magnetic head 202 and a gold-plated pattern 206 to be used for checking whether a camera is operating normally or not.

Figure 5:
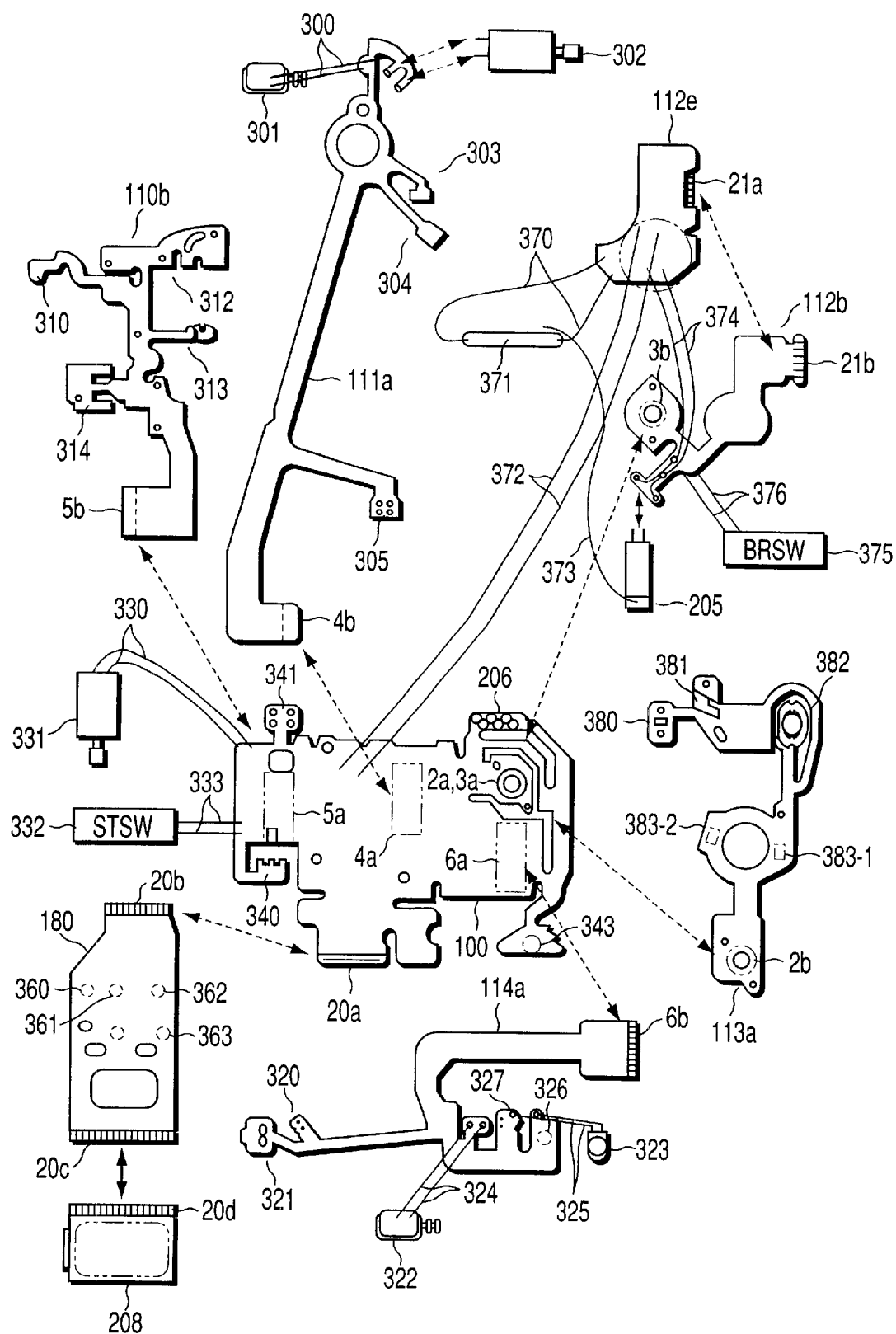
FIG. 5 is a view for showing a state that each flexible circuit board shown in FIG. 4 is exposed.

FIG. 5 is a view for showing a state that each flexible circuit board illustrated in FIG. 4 is exposed. The mirror frame flexible circuit board lila is provided with a photo-interruptor pattern (LDPI) 303 for detecting a lens driving position, a photo-interruptor pattern (AEPI) 304 for detecting a movement of a shutter blade, and a photo-reflector pattern (ZPR) 305 for detecting a focal distance. The mirror frame flexible circuit board 111a is installed with a plunger 301 for opening and closing a shutter by a lead wire 300. At the same time, a motor (LD motor) 302 for driving a focusing lens is soldered in a pierced state in the mirror frame flexible circuit board lila. The module-side connector 4b of the mirror frame flexible circuit board 111a is connected to the main circuit board connector 4a of the main flexible circuit board 100.

The finder flexible circuit board 10b is installed with a pattern (AE) 310 for a photometric device, a pattern (PARSW) 312 for a screen size change-over switch, a pattern (FLED) 313 for a finder display LED, and a pattern (AF) 314 for an AF module. The module-side connector 5b of the finder flexible circuit board 10b is connected to the main circuit board connector 5a of the main flexible circuit board 100.

The film feeding flexible circuit board 114a is provided with a pattern (clutch PI) 320 for a clutch photo-interruptor, a pattern (motor PI) 321 for a motor photo-interruptor for detecting a rotation of the film driving motor, a pattern 327 for a photo-interruptor for detecting a completion of a change-over, and a pattern 326 for an eject switch for opening and closing a lid of a cartridge chamber. At the same time, the film feeding flexible circuit board 114a is connected with a plunger (WZ plunger) 322 for changing over a driving force through a lead wire 324, and a remote control light receiving device 323 through a lead wire 325. The module-side connector 6b of the film feeding flexible circuit board 114a is connected to the main circuit board connector 6a of the main flexible circuit board 100.

Further, the main flexible circuit board 100 is connected with a spool motor (WZ motor) 331 through a lead wire 330, and is also connected with a splash type stroboscopic switch 332 through a lead wire 333.

Further, the main flexible circuit board 100 is provided with a pattern (WPR) 341 for a photo-reflector for detecting a wind-up of a film, a pattern 340 for a magnetic head, a gold-plated pattern 206 for checking the operation of a camera, and a pattern 343 for a zoom switch.

The relay flexible circuit board 180 is provided with various kinds of switch patterns including a pattern (SET MODE) 360 for a date and time setting button, a pattern (SELF) 361 for a self-photographing button, a pattern 362 for a wind-back switch, and a pattern 363 for a stroboscopic mode change-over switch. A connection section 20b of the relay flexible circuit board 180 is bonded by thermocompression to a connection section 20a of the main flexible circuit board 100. The other connection section 20c of the relay flexible circuit board 180 is bonded by thermocompression to a connection section 20d of a display LCD 208.

The stroboscopic circuit board 112e is connected with a xenon (Xe) tube 371 through a lead wire 370. This xenon tube 371 is connected to a trigger transformer 205 through a lead wire 373. The stroboscopic flexible circuit board 112b is connected, through a lead wire 376, with a barrier switch (BRSW) 375 as a main switch for starting a camera. At the same time, the trigger transformer 205 is soldered to the stroboscopic flexible circuit board 112b in a pierced state. This portion is connected to the stroboscopic flexible circuit board 112e through a lead wire 374. Further, a connection section 21a of the stroboscopic circuit board 112e is soldered to a connection section 21b of the stroboscopic flexible circuit board 112b. The module-side connector 3b of the stroboscopic flexible circuit board 112b is connected to the main circuit board connector 3a of the main flexible circuit board 100.

The cartridge flexible circuit board 113a is provided with a pattern 380 for a self-photographing LED, a pattern 381 for a cartridge lid open/close detecting switch (BKSW), a pattern 382 for a release switch, and patterns 383-1 and 383-2 for a bar-code reading photo-reflector. The module-side connector 2b of the cartridge flexible circuit board 113a is connected to the main circuit board connector 2a of the main flexible circuit board 100.

There will be explained in detail below embodiments of the invention by taking an example of selectively connecting to the main circuit board a passive AF unit and an active AF unit as a plurality of unit circuit boards.

Figure 6:
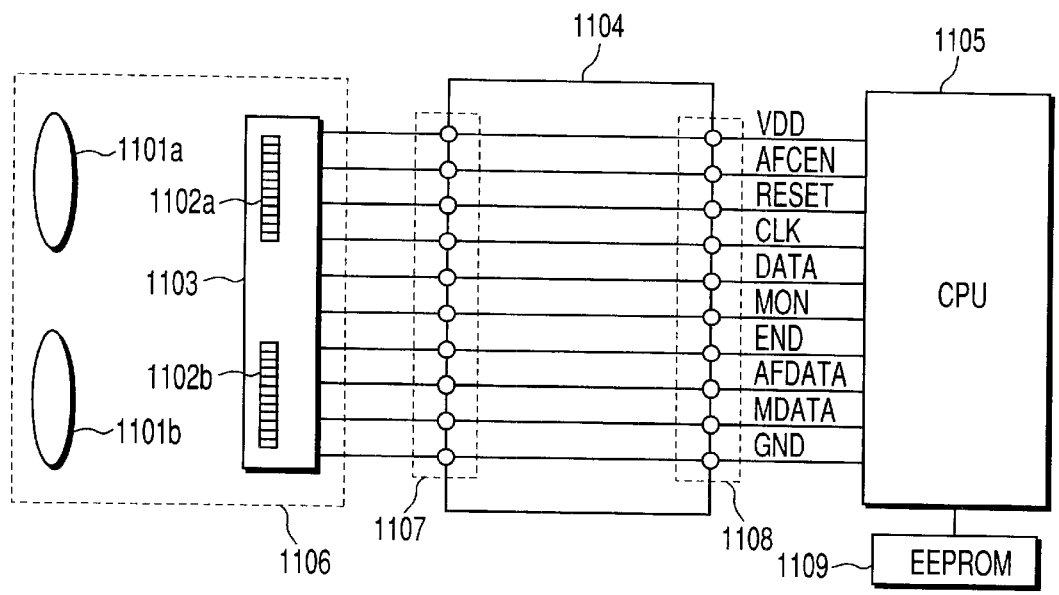
FIG. 6 is a view for explaining a first embodiment of the present invention, which shows a structure of a passive AF unit disposed on the main circuit board.
Figure 7:
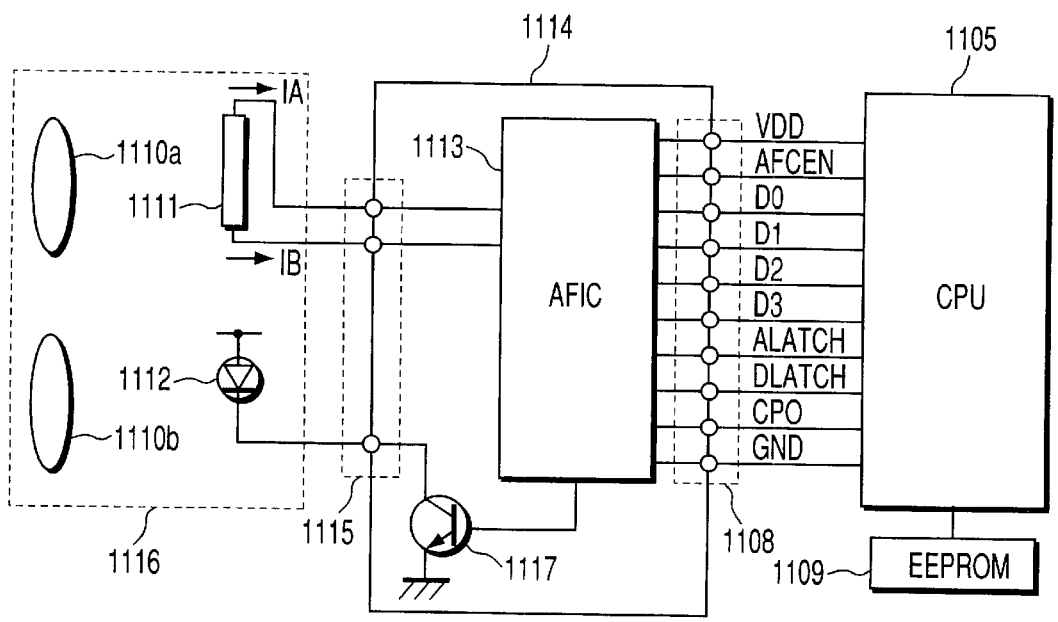
FIG. 7 is a view for explaining the first embodiment of the present invention, which shows a structure of an active AF unit disposed on the main circuit board.

FIGS. 6 and 7 are views for explaining a first embodiment of the present invention. FIG. 6 shows a structure having a passive AF unit disposed on a main circuit board. A CPU 1105 carries out various calculations, an input of AF data output from a passive AF flexible circuit board 1104, an A/D conversion, and an output of various kinds of control signals. The CPU 1105 is connected with a non-volatile memory 1109 such as an EEPROM for storing values of F_ACTIVE (active flag) to be described later, and various kinds of set values and adjusted values. As values of F_ACTIVE, "1" is written for an active distance measuring, and "0" is written as a passive distance measuring, at the time of assembling a camera.

A passive AF module 1106 includes light receiving lenses 1101a and 1101b for forming an image of an object on line sensors to be described later, and line sensors 1102a and 1102b for photoelectrically converting an image of the object image-formed by the light-receiving lenses 1101a and 1101b, according to a light intensity, and for integrating the image. At the same time the passive AF module 1106 has such a structure that an AFIC 1103 for controlling the integration operation by the line sensors 1102a and 1102b and for outputting sensor data and monitor data for integration control is integrated together with a light-shielding case not shown.

The passive AF flexible circuit board 1104 connects lines between a terminal of the AFIC 1103 and each port, (ten ports in total in the drawing) of the CPU 1105. A reference numeral 1107 denotes a land for soldering the terminal of the AFIC 1103 to the passive AF flexible circuit board 1104. A reference numeral 1108 denotes a connector for connecting a main circuit board not shown with the passive AF flexible circuit board 1104 or the active AF flexible circuit board 1205.

Further, in FIG. 6, VDD denotes a power source line for the AFIC 1103, AFCEN denotes a control line for turning on and off the power source of the AFIC 1103, RESET denotes a reset control line for the AFICI 1103, CLK denotes a clock line for serial communications between the AFIC 1103 and the CPU 1105 and for reading sensor data, DATA denotes a serial communications data line between the AFIC 1103 and the CPU 1105, MON denotes a sample hold control line relating to monitor data, END denotes an output line of an integration end signal (output of the AFIC 1103), AFDATA denotes an output line of sensor data (output of the AFIC 1103), MDATA denotes an output line of monitor data, that is an output of the AFIC 1103, and GND denotes a ground line.

FIG. 7 shows a structure having the active AF unit disposed on the main circuit board. In FIG. 7, elements identical with those in FIG. 6 are attached with the identical reference numerals, and their explanation will be omitted.

The active AF module 1116 is mounted with an IRED 1112 for generating infrared rays, a projection lens 1110b for projecting a light from the IRED 1112 to an object, a light-receiving lens 110a for receiving a diffused reflection beam from the object, and a PSD 1111 for outputting currents IA and IB at a rate according to incident positions of reflection beams from the object.

The active AF flexible circuit board 1114 is also mounted with an AFIC 1113 for controlling a light emission from the IRED 1112, calculating a rate of the output currents IA and IB of the PSD 1111 and outputting AF data, an IRED driver 1117 for driving the IRED 1112, and distance measuring parts not shown of a capacitor and the like.

A reference numeral 1115 denotes a land for mounting the PSD 1111 and the IRED 1112. This land becomes a connector for connecting signal lines between the PSD 1111 and the IRED 1112 when they are on different circuit boards.

In FIG. 7, VDD denotes a power source line for the AFIC 1113, AFCEN denotes a control line for turning on and off the AFIC 1113, D0 to D3 denote data lines for controlling the AFIC 1113, ALATCH denotes an address latch line for inputting address data to the AFIC 1113, DLATCH denotes a data latch line for inputting data to the AFIC 1113, CPO denotes an AF data output line (an output of the AFIC 1113), and GND denotes a ground line.

Figure 8:
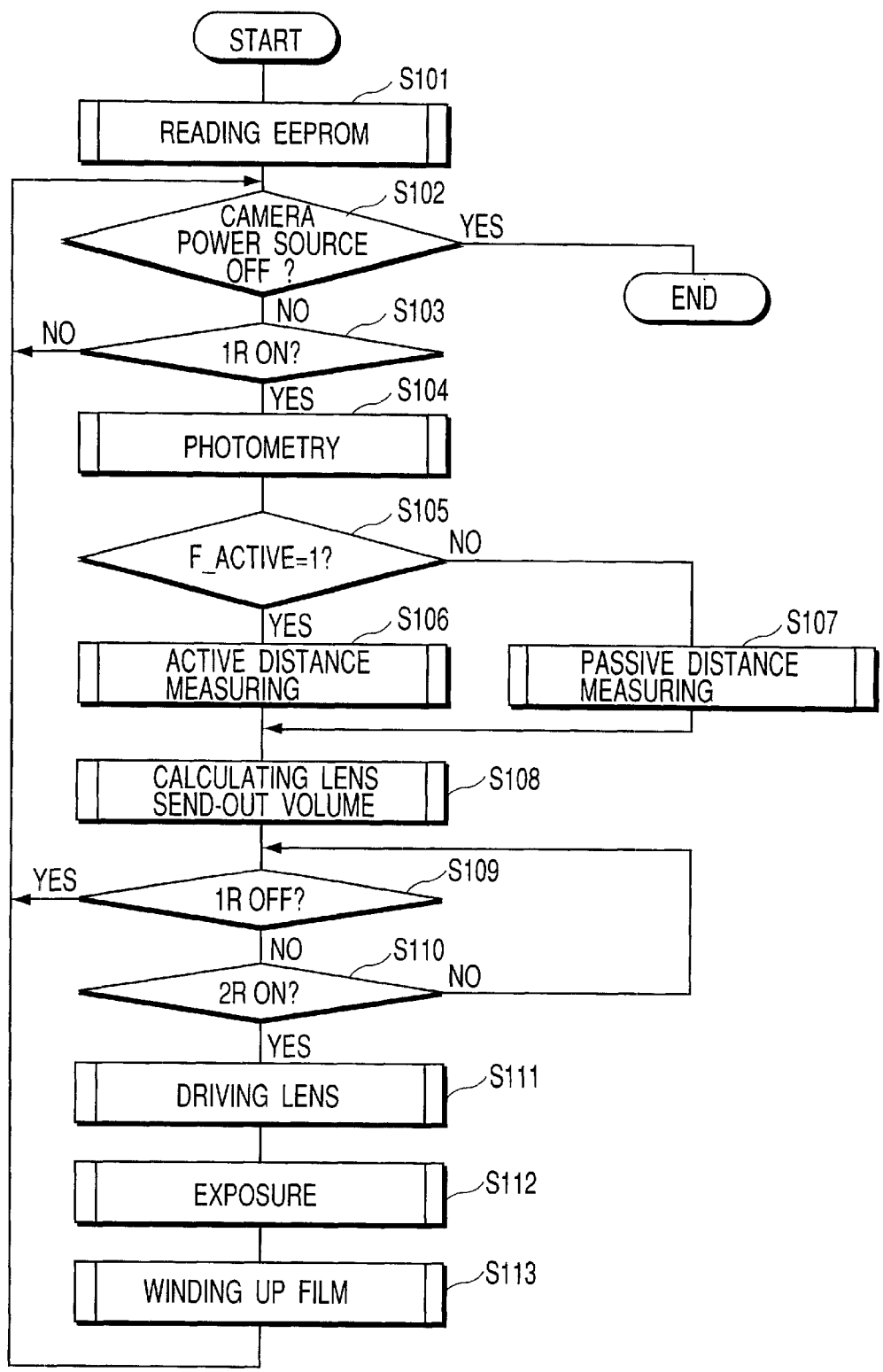
FIG. 8 is a flowchart for explaining a process of a release sequence in the first embodiment of the present invention.

FIG. 8 is a flowchart for explaining a process of the release sequence. At first, in step S101, various kinds of set values and adjusted values including F_ACTIVE (the active flag) are read from the non-volatile memory 1109 such as an EEPROM, and they are expanded on the RAM of the CPU 1105. In the next step S102, a decision is made as to whether the power source of the camera has been turned off or not. When the power source has been turned off, the photographing operation is finished. When the power source of the camera is on, the process proceeds to step S103. In step S103, a decision is made as to whether the first release (1R) switch is on or not. When the switch is on, the process proceeds to step S104. When the switch is off, the process returns to step S102.

In step S104, the luminance of an object is measured (photometry), and an exposure volume is calculated based on the measured light value obtained. Next, in step S105, a decision is made as to whether F_ACTIVE is 1 or not, based on the contents read from the nonvolatile memory 1109 in step S101. When the result is YES, the process proceeds to step S106. When F_ACTIVE is 0, the process proceeds to step S107.

In step S106, a program for the active AF is started to carry out an active distance measuring. In step S107, a program for the passive AF is started to carry out a passive distance measuring. After step S106 or step S107, the process proceeds to step S108, and a send-out volume of a focus adjusting lens is calculated based on the result of the distance measuring. In the next step S109, a decision is made as to whether the first release (1R) switch is off or not. When the switch is off, the process returns to step S102. When the switch is on, the process proceeds to step S110. In step S110, a decision is made as to whether a second release (2R) switch is on or not. When the switch is on, the process proceeds to step S111. When the switch is off, the process returns to step S109.

In step S111, the focus-adjusting lens is driven based on the sent-out volume of the lens obtained in step S108. In the next step S112, a film is exposed with a light based on the exposure volume obtained in step S104. In the next step S113, one frame of the film is wound up, and the process returns to step S102.

Figure 9:
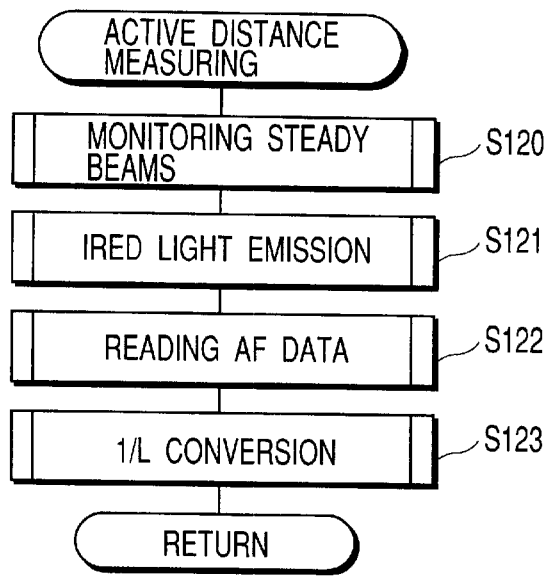
FIG. 9 is a flowchart for explaining a process of an active distance measuring in step S106 of the flowchart shown in FIG. 8.

FIG. 9 is a flowchart for explaining the process of the active distance measuring mentioned in step S106. At first, in step S120, a capacitor not shown for holding steady beams is charged in order to cut steady beams which are being incident. Next, in step S121, a signal beam is projected to an object and the signal beam currents IA and IB based on the reflection beams are taken into the AFIC 1113, and a rate is calculated to obtain the AF data. In the next step S122, the AF data is read from the AFIC 1113, and this data is taken into the CPU 1105. In the next step S123, the CPU 1105 converts the read AF data into 1/L (1/distance) data.

Figure 10:
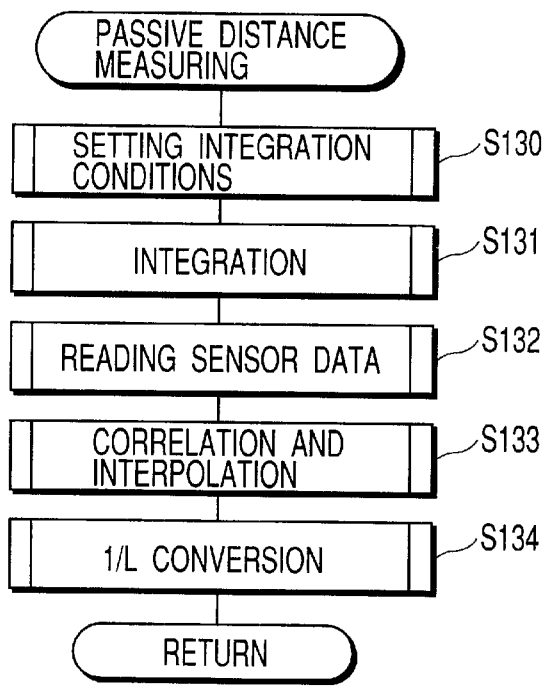
FIG. 10 is a flowchart for explaining a process of a passive distance measuring in step S107 shown in FIG. 8.

FIG. 10 is a flowchart for explaining the process of the passive distance measuring mentioned in step S107. At first, in step S130, integration conditions such as a sensor sensitivity and an integration time are set. In the next step S131, a sensor integration is carried out, and an image of an object is taken into the AFIC 1103. In the next step S132, the CPU 1105 reads the sensor data from the AFIC 1103, A/D converts the data, and stores the result in the RAM.

In step S133, a correlation and an interpolation are carried out by using the sensor data read in step S132, and AF data is calculated. In the next step S134, the AF data is converted into 1/L (1/distance) data.

Figure 11:
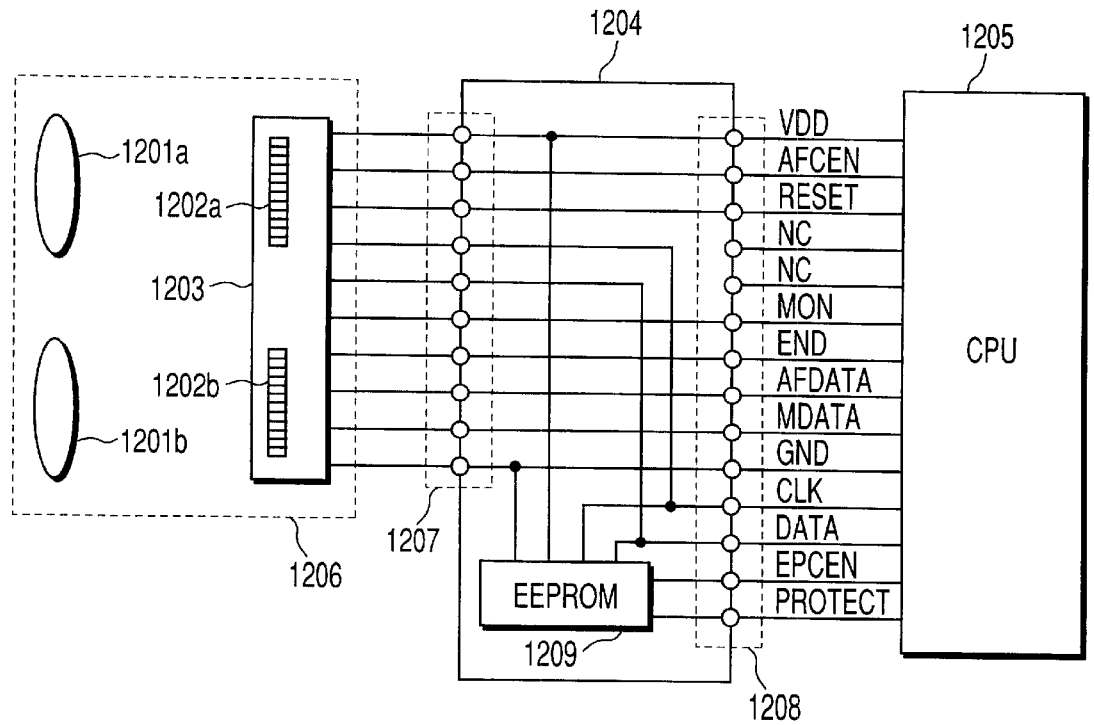
FIG. 11 is a view for explaining a second embodiment of the present invention, which shows a structure of a passive AF unit disposed on a main circuit board.
Figure 12:
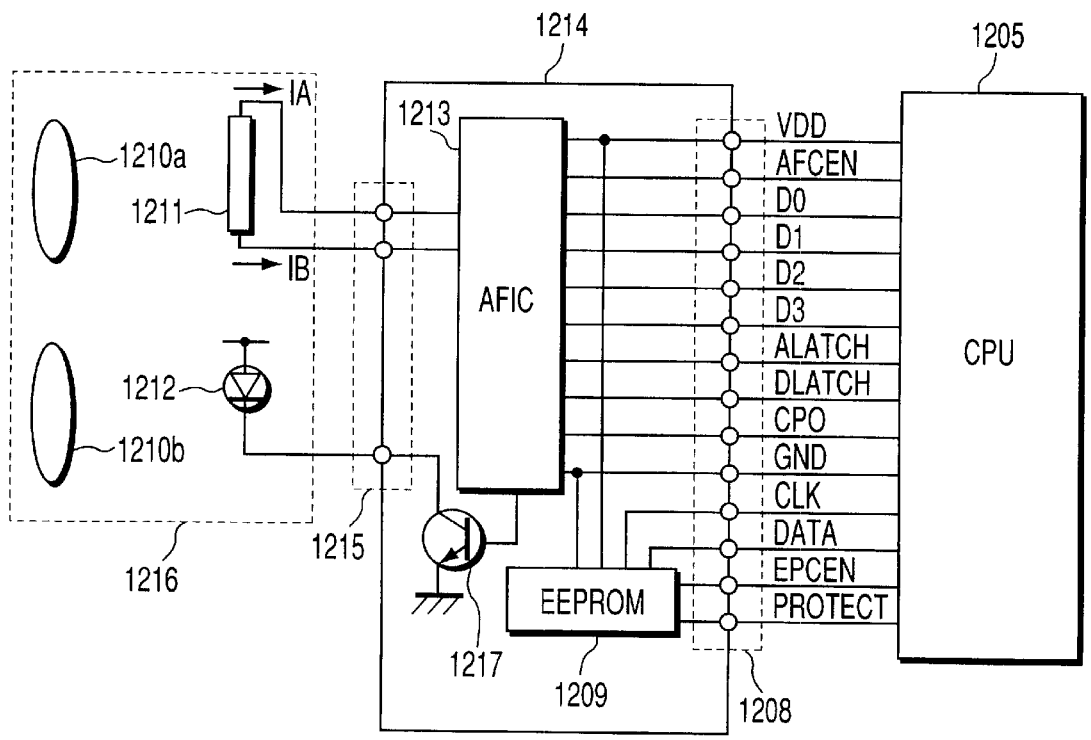
FIG. 12 is a view for explaining the second embodiment of the present invention, which shows a structure of an active AF unit disposed on the main circuit board.

FIGS. 11 and 12 are views for explaining a second embodiment of the present invention. The second embodiment is characterized in that the nonvolatile memories such as the EEPROM disposed on the main circuit board in the first embodiment are disposed on the active and passive AF flexible circuit boards respectively. In this case, the non-volatile memories such as the EEPROM may be separate parts to be exclusively used for the AF.

FIG. 11 shows a structure having the passive AF unit disposed on the main circuit board. A passive AF flexible circuit board 1204 is for connecting lines between each port of the terminal of an AFIC 1203 and a CPU 1205. The passive AF flexible circuit board 1204 has mounted thereon a nonvolatile memory 1209 such as an EEPROM for storing F_ACTIVE (active flag) and various kinds of set values and adjusted values. In this case, the F_ACTIVE is set equal to 0 for the passive AF.

In FIG. 11, NC denotes a non-connection. CLK denotes a clock line for serial communications between the AFIC 1203 and the CPU 1205 and for reading sensor data, as well as a clock line for serial communications between the EEPROM 1209 and the CPU 1205. DATA denotes a data line for serial communications between the AFIC 1203 and the CPU 1205, as well as a data line for serial communications between the EEPROM 1209 and the CPU 1205. EPSEN denotes a chip selection control line for the EEPROM 1209, and PROTECT denotes a write protection control line for the EEPROM 1209. Other structures are similar to those of the first embodiment, and their explanation will be omitted.

FIG. 12 shows a structure having the active AF unit disposed on the main circuit board. In FIG. 12, an active AF flexible circuit board 1214 has mounted thereon a PSD 1211, an IRED 1212, an AFIC 1213, an IRED driver 1216, distance measuring parts not shown such as a capacitor, and a nonvolatile memory 1217 such as an EEPROM. The nonvolatile memory 1217 stores F_ACTIVE (active flag) and various kinds of set values and adjusted values. In this case, the flag F ACTIVE is set equal to 1 for the active AF.

In FIG. 12, CLK denotes a clock line for serial communications between the EEPROM 1209 and the CPU 1205, DATA denotes a data line for serial communications between the EEPROM 1209 and the CPU 1205, EPSEN denotes a chip selection control line for the EEPROM 1209, and PROTECT denotes a write protection control line for the EEPROM 1209. Other structures are similar to those of the first embodiment, and their explanation will be omitted.

The process of the release sequence in the second embodiment is basically similar to that of the first embodiment. In this case, when the passive AF unit or the active AF unit has been connected to the main circuit board, the contents of the nonvolatile memory 1209 or 1217 are read by the CPU 1205, and a distance measuring system is determined based on the value of F_ACTIVE in this case.

FIGS. 13 and 14 are views for explaining a third embodiment of the present invention. According to the third embodiment, an active/passive decision port P_AFSEL is provided in the CPU, and a decision is made as to whether an active AF control is carried out or a passive AF control is carried out, based on whether the input level of the port P_AFSEL is a VDD level (H level) or a GND level (L level).

FIG. 13 shows a structure having a passive AF unit disposed on the main circuit board. In FIG. 13, AFSEL denotes an active/passive decision line. When a passive AF flexible circuit board 1304 is connected, AGND on the passive AF flexible circuit board 1304 and the port P_AFSEL of a CPU 1305 are connected.

FIG. 14 shows a structure having the active AF unit disposed on the main circuit board. In FIG. 14, AFSEL denotes an active/passive decision line. When an active AF flexible circuit board 1314 is connected, VDD on the active AF flexible circuit board 1314 and P_AFSEL of a CPU 1305 are connected. Other structures are similar to those of the first embodiment.

Figure 15:
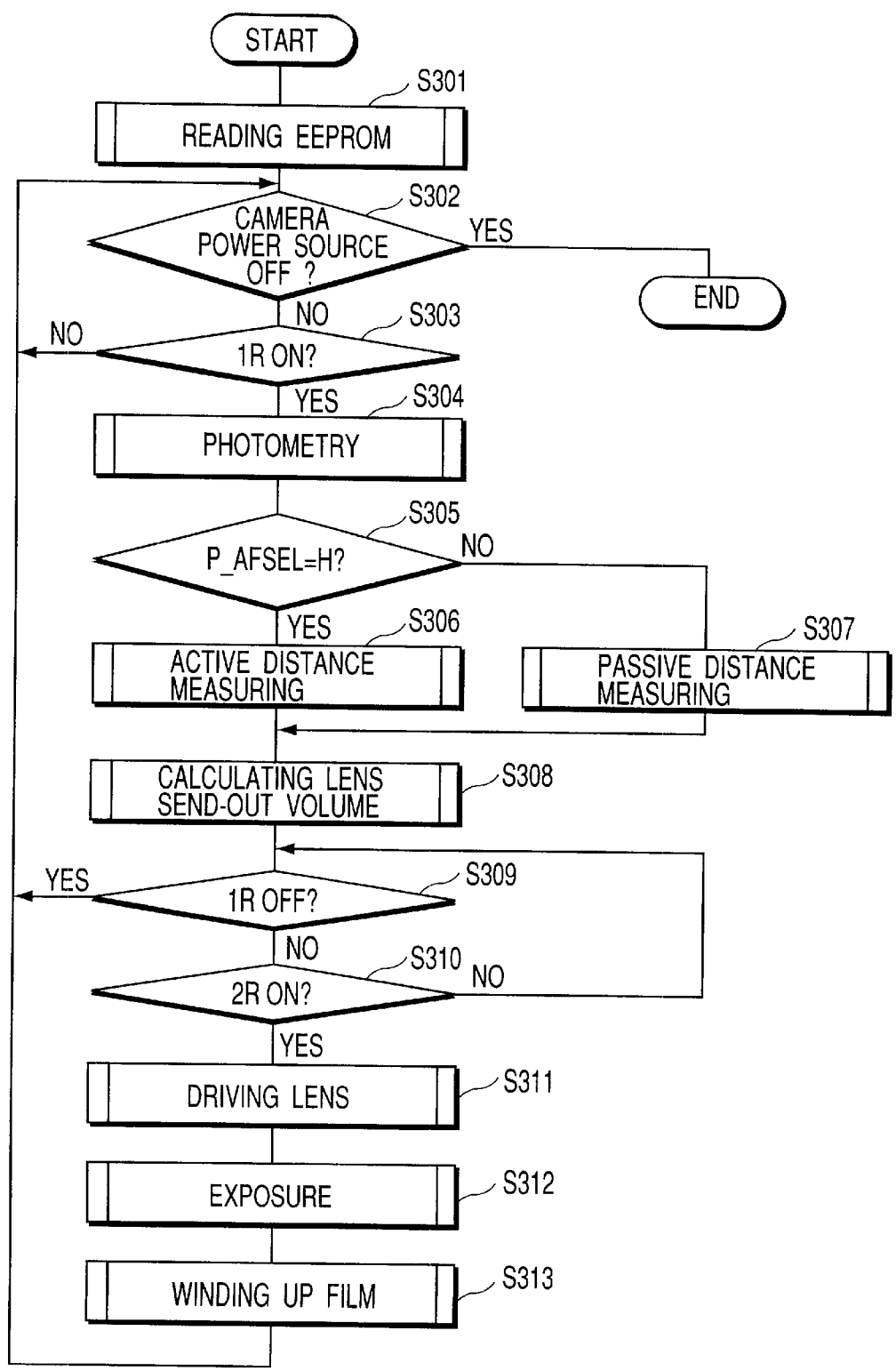
FIG. 15 is a flowchart for explaining a process of a release sequence in the third embodiment of the present invention.

FIG. 15 is a flowchart for explaining a process of the release sequence in the third embodiment. In this flowchart, in step S305, a decision is made as to whether the port P_AFSEL of the CPU 1305 is H (VDD level) or not. When the decision is YES, the process proceeds to step S306, and an active distance measuring is carried out. When the decision is NO, the process proceeds to step S307, and a passive distance measuring is carried out. In other words, according to the third embodiment, when the passive AF unit or the active AF unit has been connected to the main circuit board, a voltage level of the port P_AFSEL is detected, and a distance measuring system is determined according to the voltage level in this case (VDD or GND). Other steps are similar to those of the first embodiment.

Figure 16:
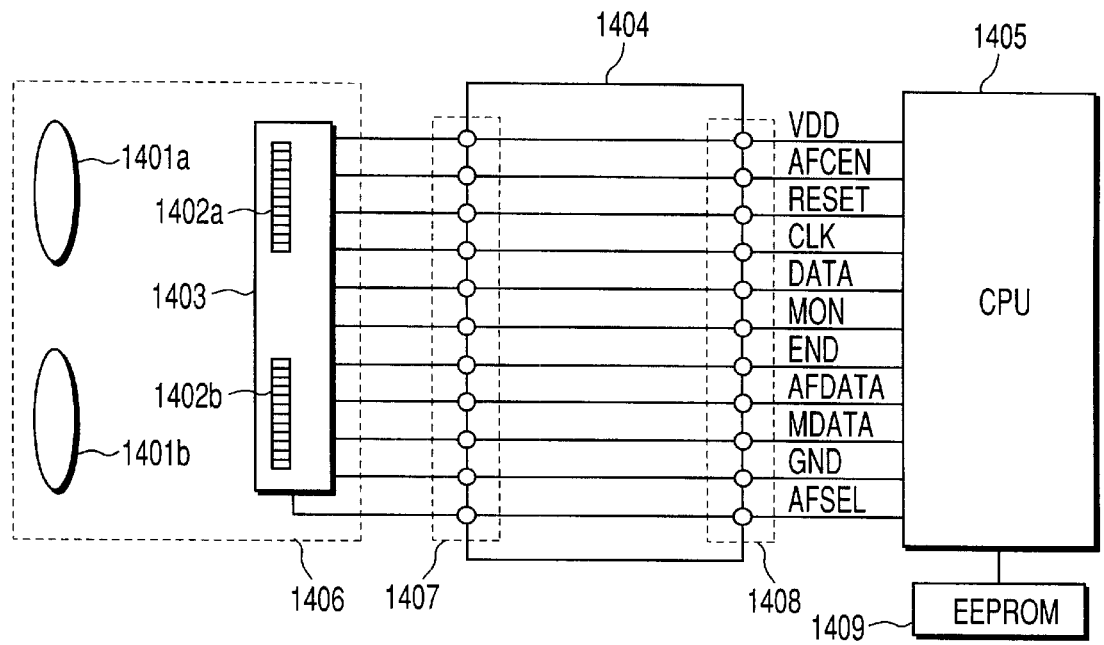
FIG. 16 is a view for explaining a fourth embodiment of the present invention, which shows a structure of a passive AF unit disposed on a main circuit board.
Figure 17:
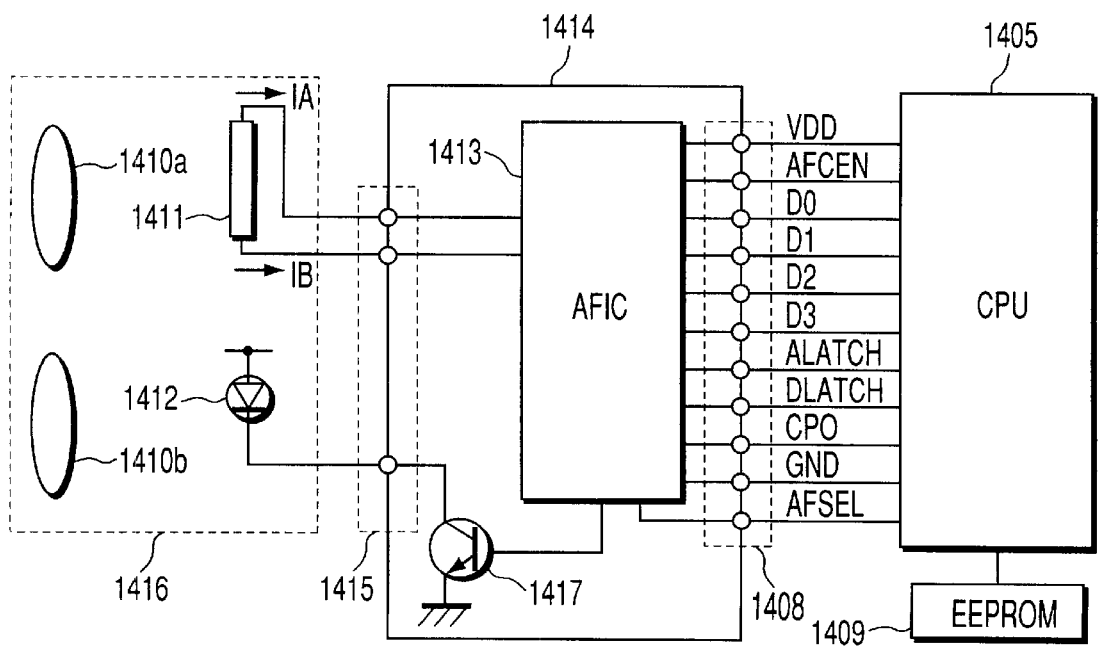
FIG. 17 is a view for explaining the fourth embodiment of the present invention, which shows a structure of an active AF unit disposed on the main circuit board.

FIGS. 16 and 17 are views for explaining a fourth embodiment of the present invention. FIG. 16 shows a structure having the passive AF unit disposed on the main circuit board, and FIG. 17 shows a structure having the active AF unit disposed on the main circuit board.

The fourth embodiment is characterized in that an active/passive decision line AFSEL is provided on an active AFIC 1413 and a passive AFIC 1403 respectively, and when it has been detected that the control line AFCEN changed from the H level to the L level, the line AFSEL is controlled to the H level or the L level.

In other words, when a passive AF unit as shown in FIG. 16 has been connected to the main circuit board, a signal of the L level is output from a CPU 1405 to an AFIC 1403 through the control line AFCEN. The AFIC 1403 outputs to the CPU 1405 a signal for making the active/passive decision line AFSEL to the L level when a change of the control line AFCEN from the H level to the L level has been detected. Thus, the CPU 1405 can decide that the passive AF unit has been connected.

Further, when an active AF unit as shown in FIG. 17 has been connected to the main circuit board, a signal of the L level is output from the CPU 1405 to an AFIC 1413 through the control line AFCEN. The AFIC 1413 outputs to the CPU 1405 a signal for making the active/passive decision line AFSEL to the H level when a change of the control line AFCEN from the H level to the L level has been detected. Thus, the CPU 1405 can decide that the passive AF unit has been connected.

In this case, the AFSEL output, when the control line AFCEN has been changed from the H level to the L level, may be set such that the active is equal to the H level and the passive is equal to the L level. Conversely, it may also be set such that the active is equal to the L level and the passive is equal to the H level.

Further, a signal input for the CPU to obtain the AFSEL output may not be the control line AFCEN. For example, when some data has been transmitted to the AFIC by serial communications, the AFIC may make an output of the AFSEL. The rest of the operation is similar to that of the first embodiment.

Figure 18:
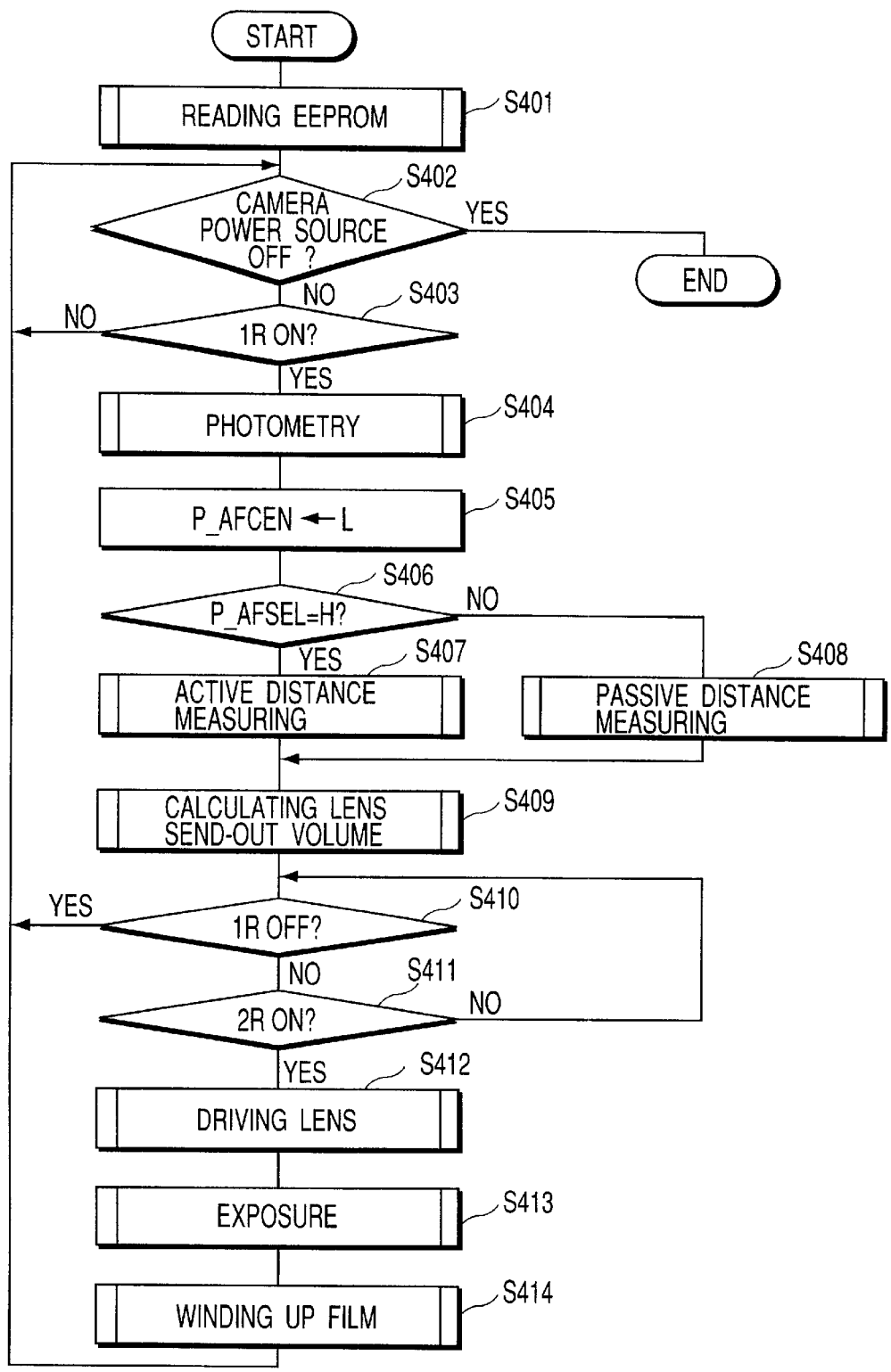
FIG. 18 is a flowchart for explaining a process of a release sequence in the fourth embodiment of the present invention.

FIG. 18 is a flowchart for explaining a process of the release sequence relating to the fourth embodiment. In this embodiment, in step S405, a port P_AFCEN corresponding to the control line AFCEN is set to the L level. In step S406, a decision is made as to whether a port P_AFSEL corresponding to the active/passive decision line AFSEL is equal to the H level or not. When the decision is YES, the process proceeds to step S407 to carry out an active distance measuring. When the decision is NO, the process proceeds to step S408 to carry out a passive distance measuring. In other words, according to the fourth embodiment, when the passive AF unit or the active AF unit has been connected to the main circuit board, the AFIC 1403 or 1414 detects that the port P_AFCEN has been set to the L level by the CPU 1405, and transmits to the CPU 1405 a signal for making the port P_AFSEL to the L level or the H level. Thus, the CPU 1405 can know which one of the AF units has been connected. The rest of the operation is similar to that of the first embodiment.

According to the structures of the third embodiment and the fourth embodiment, the CPU makes a decision as to whether the active AF unit has been connected or the passive AF unit has been connected, based on the signal level of the active/passive decision line AFSEL. However, as the value of F_ACTIVE is stored in both the nonvolatile memories 1309 (in the case of the third embodiment) and 1409 (in the case of the fourth embodiment) connected to the CPU, both data may be compared with each other and a distance measuring is carried out only when both data coincide with each other. By this comparison, it is possible to decide, for example, whether the data within the nonvolatile memory is correct or not.

Further, in the fourth embodiment, it is possible to arrange such that when the AF unit is connected to the main circuit board, the CPU transmits a specific binary code to the AFIC through the control line AFCEN, and makes a decision as to whether a normal AF unit has been connected or not, based on a binary code transmitted from the AFIC in response to the binary code sent to the AFIC. By this arrangement, it is also possible to decide whether a version of the AF unit is different from that used in the system or not although the type of the AF unit is the same as that used in the system.

In the above-described embodiments, a description has been made about a structure in which the active AF unit and the passive AF unit can be selectively connected to one main circuit board. However, it is needless to mention that units which can be connected to the main circuit board are not limited to the active AF unit and the passive AF unit, but a super-combination AF unit to be described hereunder can also be connected to the main circuit board.

A new-type auto-focusing technique called a super-combination AF system will be explained below. This auto-focusing technique is not a simple combination of the conventional active AF system and passive AF system. This system carries out a detection of a main object by a combined use of these two systems.

FIG. 19A is a block diagram for showing a main structure for achieving the super-combination AF. Beams from an object 520 are incident to two area sensors 502a and 502b through two light-receiving lenses respectively. These area sensors 502a and 502b are for receiving beams of the object 520 and then photoelectrically converting the beams. Outputs from these area sensors are A/D converted by an A/D converter 502c, and digital values of pixels are input to a microcomputer (CPU) 501 for controlling a camera.

The area sensors 502a and 502b are connected with a steady-beam removing circuit 502d. When this steady-beam removing circuit 502d is controlled by the CPU 501, a DC light signal steadily incident from the object 520 is removed, and only a pulse beam from a light source 505a is obtained as an output signal.

Accordingly, when the CPU 501 controls light-emitting means 505 to drive the light source 505a and irradiates beams to the object 520 in a state that the steady-beam removing circuit 502*d* is being operated, an image pattern as shown in FIG. 19B is formed on the area sensors 502*a* and 502*b* based on reflection signal beams from the object 520. FIG. 19B shows a state that beams are incident to a black portion. The CPU 501 is built with a software for analyzing an image pattern formed on the area sensors 502*a* and 502*b*. When a decision is made based on this software that the image pattern is a shape of a man, this image pattern can be regarded as a main object.

FIG. 20 is a flowchart for showing a process of a distance measuring based on the above-described super-combination AF. At first, in steps S501 and S502, the light source 505*a* is driven prior to the distance measuring, and only a pattern of a reflection signal beams as shown in FIG. 19B is taken out. In the next step S503, a decision is made as to whether this pattern is a main object or not, based on the shape of a man. When the decision is YES, the process proceeds to step S504. In step S504, a decision is made as to whether the intensity of beams forming the above pattern is strong or not, or whether there is a sufficient contrast or not. Based on this decision, a selection is made as to which one of an active system and a passive system is to be used as a light measuring system; the active system is of a type for measuring a distance from an object based on a signal beam emitted from a camera side to the object and a reflection signal beam received from the object; and the passive system is of a type for measuring the distance based on an image signal of the object.

In other words, when the contrast of the image signal is weak, the process branches to step S510, and the active AF is carried out with an emphasis on the position of the main object obtained earlier, by irradiating a distance-measuring beam again to the object and obtaining reflection signal beams (after removal of steady beams) from the object.

Further, when a decision has been made that the intensity of the reflection signal beams is low in step S504, a decision is made that the passive AF is suitable, and the process branches to step S505. In this case, a distance measuring is carried out according to the passive system mainly using the image signal at the position of the main object obtained earlier.

When a main object has not been able to be detected in step S503, a luminance signal or the like is added, and the active system or the passive system is selected. Thereafter, a distance is measured with an emphasis on a screen center portion where there is a high possibility of the existence of the object.

Further, in steps S506, S512 and S521, the CPU 501 carries out a control so that a plurality of voice signals are output, that is, a voice pattern 2, a voice pattern 3 and a voice pattern 1, according to a YES or NO decision result of the above-described distance measuring systems or the main object. With this arrangement, a user can carry out a distance measuring easily and with comfort by taking the advantage of the super-combination AF.

According to the present invention, it is possible to obtain a target camera structure by merely exchanging a relevant unit of a camera when there has been a change in the version of the system or when a type of the camera has been changed to a different type. Because of this advantage of camera structure, cameras can be used commonly in manufacturing stages, so that cameras can be provided at low cost.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electric circuit board system for a camera, comprising:

at least one main electric circuit board having a central processing unit for effecting control of a camera, and at least one connection section for establishing an electric connection with other electric circuit boards; and a plurality of unit circuit boards which have mutually different specifications and which are capable of being connected with the at least one connection section, wherein any one optional unit circuit board is selected from the plurality of unit circuit boards, and is connected to at least one of the main electric circuit boards for structuring a camera, when the camera is manufactured, and wherein in said camera that is manufactured, the central processing unit controls the camera according to a specification of the selected unit circuit board.

2. An electric circuit board system for a camera according to claim 1, wherein the plurality of unit circuit boards include circuit boards provided with photometric devices for carrying out an average photometry and circuit boards provided with photometric devices for carrying out an inverse beam photometry.

3. An electric circuit board system for a camera according to claim 1, wherein the plurality of unit circuit boards include circuit boards mounted with a zoom lens for changing a focal distance and circuit boards mounted with a single focal-point lens.

* * * * *